(12) United States Patent
Moran et al.

(10) Patent No.: US 9,870,648 B2
(45) Date of Patent: Jan. 16, 2018

(54) VIRTUAL PARKING LOTS

(71) Applicant: Municipal Parking Services, Inc., Minnetonka, MN (US)

(72) Inventors: Mark J. Moran, Woodbury, MN (US); Richard. W. Kelley, II, Corcoran, MN (US); Marcus N. Schmidt, Minnetonka, MN (US); David E. Collins, Jr., Plymouth, MN (US)

(73) Assignee: Municipal Parking Services, Inc., Minnetonka, MN (US)

( * ) Notice: Subject to any disclaimer, the term of this patent is extended or adjusted under 35 U.S.C. 154(b) by 0 days.

(21) Appl. No.: 15/223,217

(22) Filed: Jul. 29, 2016

(65) Prior Publication Data

US 2017/0032583 A1 Feb. 2, 2017

Related U.S. Application Data

(60) Provisional application No. 62/199,149, filed on Jul. 30, 2015.

(51) Int. Cl.
*G07B 15/02* (2011.01)
*G06F 17/30* (2006.01)
(Continued)

(52) U.S. Cl.
CPC ....... *G07B 15/02* (2013.01); *G06F 17/30864* (2013.01); *G06K 9/00771* (2013.01); *G06K 9/00785* (2013.01); *G06K 9/325* (2013.01); *G06K 9/6267* (2013.01); *G08G 1/015* (2013.01); *G08G 1/0116* (2013.01); *G08G 1/0175* (2013.01); *G08G 1/04* (2013.01); *G08G 1/065* (2013.01); *G08G 1/149* (2013.01);
(Continued)

(58) Field of Classification Search
CPC ........ G07B 15/02; G08G 1/149; G08G 1/065; G08G 1/04; G08G 1/015; G08G 1/0116; G08G 1/0175; G06K 9/00771; G06K 9/00785; G06K 9/6267; G06K 9/325; G06K 2209/23; G06F 17/30864; H04N 5/247
USPC ....................................................... 382/104
See application file for complete search history.

(56) References Cited

U.S. PATENT DOCUMENTS 8,625,853 B2 1/2014 Carbonell et al.
2005/0280555 A1 12/2005 Warner, IV
(Continued)

OTHER PUBLICATIONS

The International Search Report and the Written Opinion rendered by the International Searching Authority for PCT/US16/44650, dated Oct. 20, 2016, 8 pages.

*Primary Examiner* — Amandeep Saini
(74) *Attorney, Agent, or Firm* — Skaar Ulbrich Macari, P.A.

(57) ABSTRACT

A central computing system is configured to monitor quotas for multiple different classifications of vehicles that park in a parking facility. License plate reading (LPR) cameras read the license information of each vehicle entering and exiting a parking facility. The vehicle images or identifications are communicated to the central computing system which updates its database and monitors each virtual lot in the parking facility according to quotas, prices and other parameters for each corresponding class of vehicles. Control gates can be provided at entrances and exits to the parking facility. A parking kiosk can be provided to the parking facility that is networked with the central computing system.

20 Claims, 4 Drawing Sheets

(51) Int. Cl.
  *G06K 9/00* (2006.01)
  *G06K 9/32* (2006.01)
  *G06K 9/62* (2006.01)
  *G08G 1/017* (2006.01)
  *H04N 5/247* (2006.01)
  *G08G 1/01* (2006.01)
  *G08G 1/015* (2006.01)
  *G08G 1/04* (2006.01)
  *G08G 1/065* (2006.01)
  *G08G 1/14* (2006.01)

(52) U.S. Cl.
  CPC ......... *H04N 5/247* (2013.01); *G06K 2209/15* (2013.01); *G06K 2209/23* (2013.01)

(56) References Cited

U.S. PATENT DOCUMENTS

| | | | |
|---|---|---|---|
| 2007/0150336 A1* | 6/2007 | Boily | G07B 15/00 705/13 |
| 2012/0285793 A1* | 11/2012 | Jones | G07B 15/02 194/217 |
| 2014/0036076 A1* | 2/2014 | Nerayoff | H04N 7/181 348/148 |
| 2014/0214499 A1 | 7/2014 | Hudson et al. | |
| 2014/0214500 A1 | 7/2014 | Hudson et al. | |

* cited by examiner

| Class | Description | Class spots | Used spots | Remaining spots |
|---|---|---|---|---|
| A | Police | 50 | 37 | 13 |
| B | Legislature | 30 | 20 | 10 |
| C | Court | 30 | 13 | 17 |
| D | Local residents | 30 | 9 | 21 |
| open | No classification | 49 | 0 | 49 |

FIG. 4

VIRTUAL PARKING LOTS

PRIORITY

This application claims the priority benefit of U.S. Provisional Application No. 62/199,149, filed on Jul. 30, 2015, which is hereby incorporated herein by reference in its entirety.

FIELD

The present invention relates generally to parking systems and, more particularly, to virtual parking lots and management of the same.

BACKGROUND

Conventional parking facilities, such as lots, are usually vehicle agnostic. This means that every vehicle entering the parking lot is counted the same. Vehicles can continue to enter the lot until the net vehicles within the lot (total vehicles entered minus the total exited) reaches a certain total.

Some lots provide a means for admitting pass holders such that they are counted separate from non-pass holders. Thus, the lot can be closed to non-pass holders so that a given number of spots is reserved for pass holders.

Managing the pass holders is an administrative burden because each pass holder must have a transponder or other device responsive to a near field communication means in order to access the lot. This adds cost and complexity to the overall system. Such devices can also be lost or stolen. Moreover, public works vehicles, police and other officials may need to access many different lots, so they might need a multitude of transponders or entry cards. This multiplies the cost and administrative complexity.

Also, current parking lot systems cannot charge multiple different rates to multiple different classes of persons or vehicles.

Thus, there is a need to provide improved parking lot management systems, methods and apparatuses that address the drawbacks of conventional parking lot systems.

SUMMARY

The present invention provides unique devices, systems and methods for managing parking monitoring and enforcement. In one disclosed embodiment, a central computing system is configured to monitor quotas for multiple different classifications of vehicles that park in a parking facility. License plate reading (LPR) cameras read the license information of each vehicle entering and exiting a parking facility. The vehicle images or identifications are communicated to the central computing system which updates its database and monitors each virtual lot in the parking facility according to quotas, prices and other parameters for each corresponding class of vehicles.

The disclosure also includes a parking facility management system, including an entrance camera positioned to view a vehicle as the vehicle enters a parking facility, an exit camera positioned to view the vehicle as the vehicle exits the parking facility, and a central control computer networked with the entrance camera and the exit camera. The central control computer includes a database of parking parameters for the parking facility. The parking parameters include parameters for a first class of vehicles and a second class of vehicles. The parameters for each of the first and second classes of vehicles includes a total number of class spots, a number of used class spots and a number of remaining class spots. The central control computer is configured to determine the classification of the vehicle as the vehicle enters the parking facility and as the vehicle exits the parking facility, increase the number of used class spots for the first class of vehicles and decrease the number of remaining class spots for the first class of vehicles when the vehicle entering the facility is determined to belong to the first class of vehicles, increase the number of used class spots for the second class of vehicles and decrease the number of remaining class spots for the second class of vehicles when the vehicle entering the facility is determined to belong to the second class of vehicles, decrease the number of used class spots for the first class of vehicles and increase the number of remaining class spots for the first class of vehicles when the vehicle exiting the facility is determined to belong to the first class of vehicles, and decrease the number of used class spots for the second class of vehicles and increase the number of remaining class spots for the second class of vehicles when the vehicle exiting the facility is determined to belong to the second class of vehicles.

The disclosure further includes a method of managing a parking facility. The method can include obtaining an image of at least a portion of a vehicle entering the parking facility, relaying an image data for the portion of the vehicle entering the parking facility to a central control computer, obtaining an image of at least a portion of the vehicle exiting the parking facility, relaying an image data for the portion of the vehicle exiting the parking facility to a central control computer, determining by the central control computer the classification of the vehicle as the vehicle enters the parking facility, storing in memory of the central control computer parking parameters for at least a first and a second class of vehicle, the parking parameters including a total number of class spots, a number of used class spots and a number of remaining class spots, increasing the number of used class spots for the first class of vehicles and decreasing the number of remaining class spots for the first class of vehicles when the vehicle entering the facility is determined to belong to the first class of vehicles, increasing the number of used class spots for the second class of vehicles and decreasing the number of remaining class spots for the second class of vehicles when the vehicle entering the facility is determined to belong to the second class of vehicles, decreasing the number of used class spots for the first class of vehicles and increasing the number of remaining class spots for the first class of vehicles when the vehicle exiting the facility is determined to belong to the first class of vehicles, and decreasing the number of used class spots for the second class of vehicles and increasing the number of remaining class spots for the second class of vehicles when the vehicle exiting the facility is determined to belong to the second class of vehicles.

The entrance camera and the exit camera can be the same camera. The entrance camera and the exit camera can be positioned to image a license plate of the vehicle. The cameras can also perform a license pate recognition function on the characters of the license plate of the vehicle.

A gate arm can be positioned adjacent to an entrance point to the parking facility and networked with the central control computer. The central control computer can be configured to raise the gate arm only after making a determination that the vehicle belongs to one of the first or second classes of vehicles.

A kiosk can be provided to the parking facility and networked with the central control computer. The kiosk can be configured to accept a payment for parking in the parking facility for the vehicle and to report a payment status for the vehicle to the central control computer.

The parking parameters can further include parameters for an open class of vehicles. The central control computer can be further configured to increase a parameter for a number of used open spots and decrease a parameter for a number of remaining open spots when the vehicle entering the facility is determined to belong to neither of the first or second classes of vehicles.

The second class of vehicles can be an open class, a class of permit holders, police, military, government employees, or any other type or class of persons or vehicles.

Upon the vehicle attempting to enter the parking facility, the central control computer can be further configured to classify a vehicle determined to belong to the first class of vehicles as a vehicle belonging to the second class of vehicles for a given parking event when the number of remaining class spots for the first class of vehicles is zero.

Upon the vehicle attempting to enter the parking facility, the central control computer can be further configured to classify a vehicle determined to belong to the first class of vehicles as a vehicle belonging to an open class of vehicles for a given parking event when the number of remaining class spots for the first class of vehicles is zero.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 4 is a table of parking parameters according to certain example embodiments.

Figure 1:
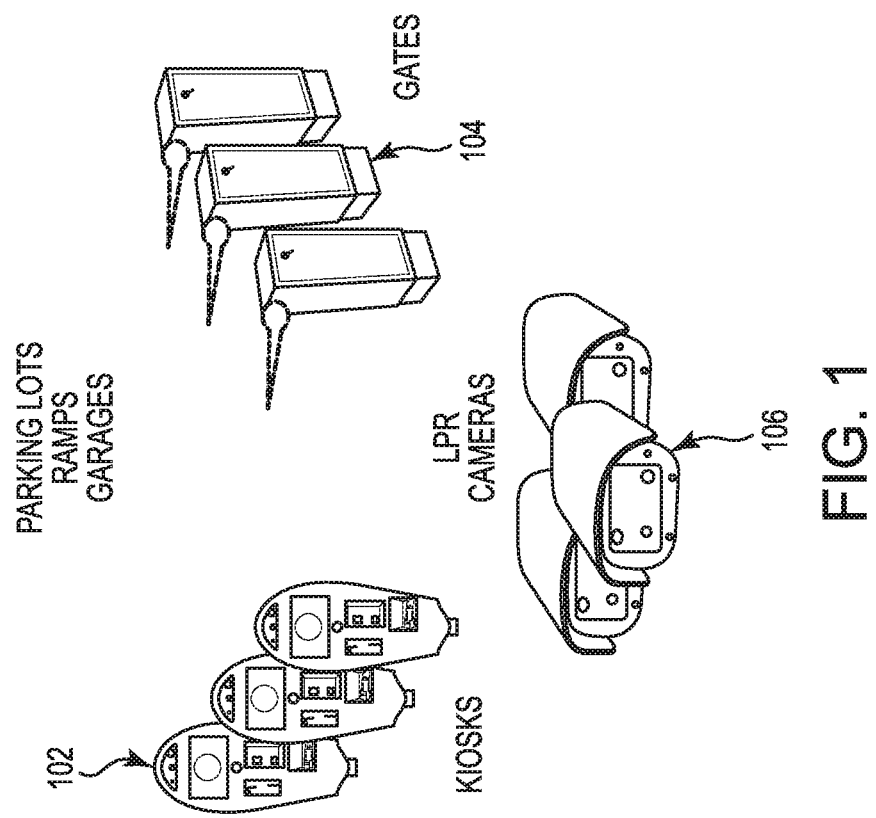
FIG. 1 is a diagram of various smart parking system components according to certain example embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Referring to FIG. 1, various components of a smart parking system are shown. Smart parking lot monitoring systems are disclosed in U.S. Pat. Pub. No. 2014/0214500 A1 (which is incorporated herein by reference in its entirety), can be deployed to monitor entry and exit to various parking lots, ramps, garages and other parking facilities. Such systems read the license plates of each vehicle entering and exiting the lot and determine the identity of the vehicle.

The smart parking system generally includes a kiosk 102 placed adjacent to the parking facility. The kiosk 102 is coupled to gates 104 and/or license plate reading (LPR) cameras 106 to monitor parking events in a parking facility. Each of the kiosks 102 is also networked with a central control computer 108, also referred to as a cloud computing system, for added control and functionality.

Each kiosk 102 includes a processor and physical memory coupled to the microprocessor. A computer readable program code can be stored in the physical memory (e.g., random access memory, flash memory or hard-drive) of the meter. The computer readable program code is configured such that when executed by the microprocessor, the code causes the kiosk to perform the steps of the invention described herein.

Figure 2:
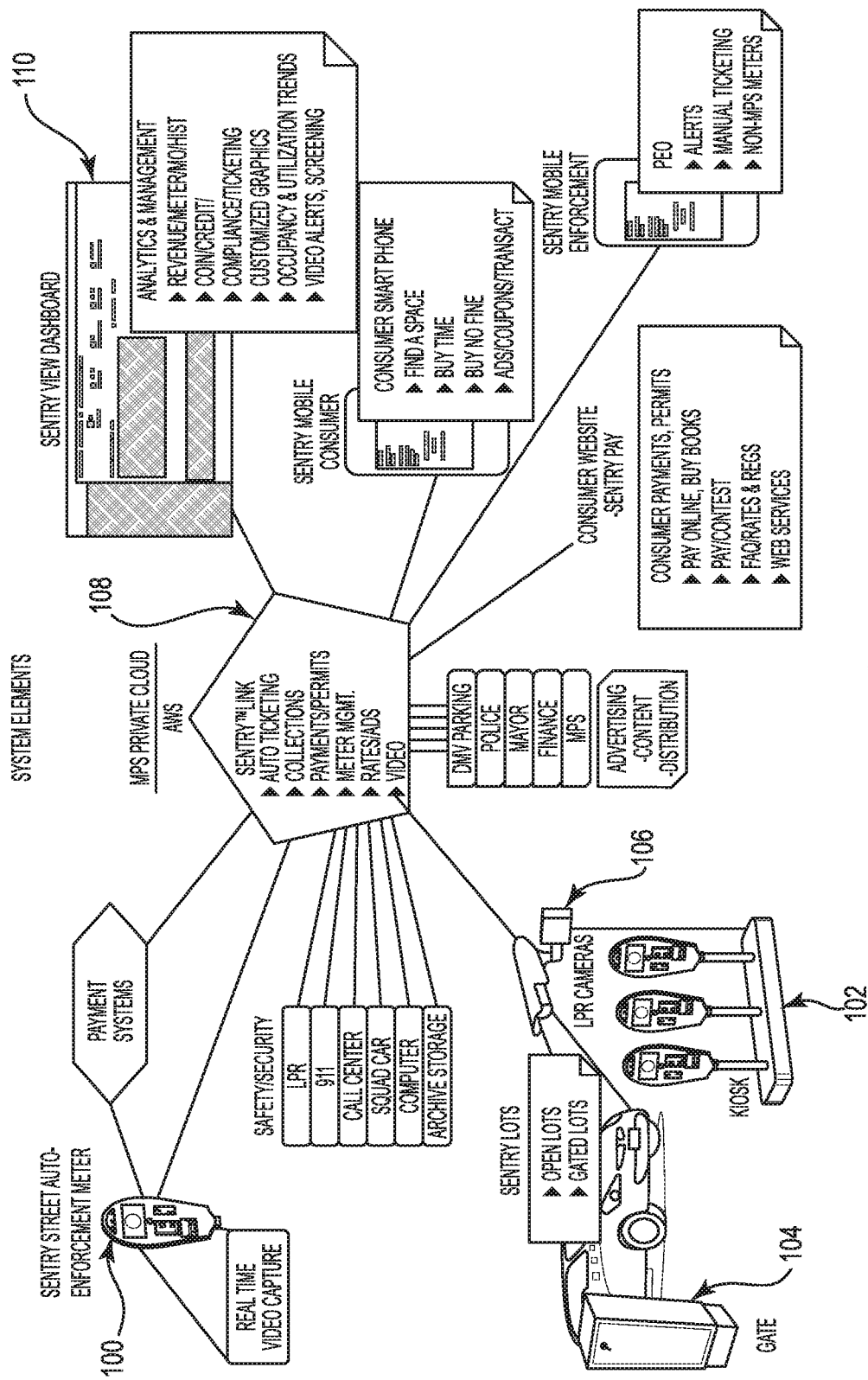
FIG. 2 is a diagram of various components of an integrated parking system according to certain example embodiments.

Referring to FIG. 2, each kiosk 102 is communicatively coupled to the so-called cloud computing system 108 via the internet or other wired or wireless connection. The cloud computing system can also be referred to as a central or control computer or server. The cloud 108 comprises one or more computer systems located remote from the meters and kiosks that is networked with the kiosks 102. The network can be wired or wireless, and the network can be either a private network (local area network or LAN) or a public network such as the world wide web (the Internet).

One or more management computers 110 such as smart phones, tablets, laptops and personal computers can communicate with each kiosks 102 via the cloud 108. The management computers 110 and kiosks 102 each include a microprocessor, memory coupled to the microprocessor, a graphical user interface, an input device (keyboard, mouse and/or touch-sensing display screen) and a network interface coupled to the microprocessor.

The network interface is configured to enable communication with a communication network (e.g. the Internet or World Wide Web), using a wireless connection (e.g. cellular such as LTE, Wi-Fi, etc.).

The memory in the computers 110 and kiosks 102 may include one or more non-volatile storage devices and/or one or more volatile storage devices (e.g., random access memory (RAM)).

A parking management application stored on the cloud server and/or in the memory management computers 110 can take the form of computer readable program code, which can be stored in the memory (e.g., random access memory, flash memory or hard-drive) of the computing device. The computer readable program code is configured such that when executed by a processor, the code causes the computer to perform the steps of the invention described herein. In other embodiments, the invention can take the form of the computing device configured to perform steps described below. In still further embodiments, the invention can take the form of a system of networked kiosks, a cloud server and a computing device. Other configurations will be apparent from the present disclosure.

Each management computer is in communication with the cloud server 108. Using application program interfaces (API's), a parking management application stored and executing on the computing device 110 can communicate with the cloud server, thereby communicating or exchanging data with the individual parking meters.

Alternatively, the parking management software can be provided in the form of a web application. In this alternative, the software is stored on the cloud server and each management computer 110 interfaces with the software via a web browser.

The ability of the smart parking system to read license plates of each vehicle parking on the lot, to report that information to a cloud server 108 in real time, or near-real time, and for the management software application to interact with that data in real time provides the parking management with a means to quickly and efficiently monitor many parking events and to simultaneously track many different classes of vehicles parking in a given parking facility.

It should be noted that the reference to a "lot" throughout this application is meant to generally refer to parking facilities, including parking lots, garages, ramps and other parking structures.

Each vehicle license plate or identification tag can be assigned to one or more different classes. For example, a police vehicle can be recognized as being in a different class than a vehicle belonging to court personnel, public works employees, legislators, local residents and pass holders. Additional and different classes can be defined without departing from the scope of the invention. And each class vehicle can be differentiated from one another. Thus, the number of vehicles parked in a given lot can be monitored on a per-class basis. An "open" or "unassigned" class can be established as a catch-all class for all vehicles lacking a specific class assignment.

The software program code is configured to sub-divide a given lot into quotas for each different class, which thus defines a plurality of virtual lots within a given lot. This can be understood further with reference to the parking lot 112 diagram of FIG. 3 and the database table of parking parameters of FIG. 4.

Figure 3:
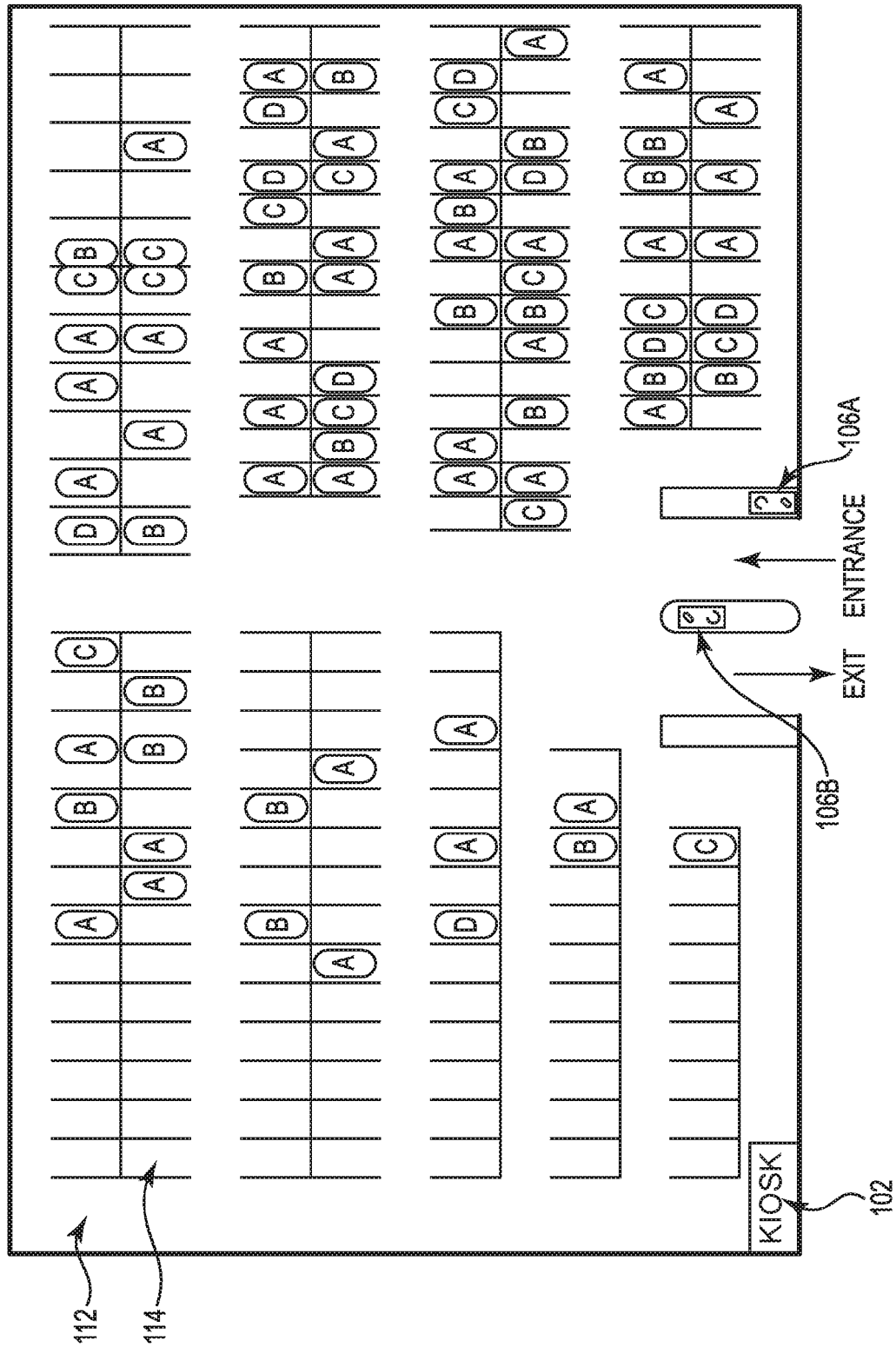
FIG. 3 is a diagram of a virtual parking lot system according to certain example embodiments.

The table of parameters in FIG. 4 defines each different class that makes up a virtual lot in the example parking lot of FIG. 3. In this example, there are four virtual lots and the remaining spaces 114 are open. Each virtual lot is assigned a maximum number of spaces. The remaining spaces in the lot after adding up all of the virtual lots are defined as the open or unclassified spots. A given lot need not have any open or unassigned spots. Additional, fewer and/or different classes can be provided in other embodiments.

The virtual lot parameters are stored as a database in the memory of the central computing system (cloud server) 108.

Referring again to FIGS. 3 and 4, in use, each vehicle entering the lot at the entrance point(s) and leaving through the exit point(s) is identified by the respective license plate reading (LPR) cameras 106A, 106B located adjacent to the entrance and exit points. The image or LPR data is reported to the cloud server 108, which updates the tabulation of vehicles in each of the virtual lots, which is stored in a database in memory.

Gates 104 can also be provided at the entrances and exits of the lot or ramp to selectively control access into or out of the parking facility.

Once the maximum quota for a given class has been reached, one of several things can occur. In one alternative, vehicles of a given class that is full can be counted as an "open" or "unassigned" class, if any such spots are available. In another alternative, vehicles of a given class that is full can be shifted to a secondary class (e.g., police class vehicles can be shifted into the local residents class). In a further alternative, vehicles of a given class that is full can be assessed a surcharge fee for exceeding the quota. Vehicles of a given class that is full can also be denied entry into the lot.

Quota parameters for a given lot can be changed manually via the management software application. For example, the class spots values in the table of FIG. 4 can be edited by authorized persons when logged into the management software application with appropriate credentials.

Quota parameters can also be changed automatically. For example, the management software application on the cloud server can increase or decrease the permitted sizes of each virtual lot based upon time of day, day of week, special days, special events and other variables that a computer can monitor and automatically adjust in reaction thereto.

The management software application can be used to enter vehicle identifications into the smart parking system's cloud server database and assign a corresponding classification.

Each class can be assessed a flat monthly fee for their quota of spaces, or a debit/credit account can be established that will assess a fee for each class member parking event. User accounts can be created for each class account to be managed, including replenishment of funds.

For example, a local business could establish a virtual lot for its employees. That business can pay a flat fee for five spaces each month, and be assessed at a discounted rate (as compared to the public rate) for up to five additional vehicles. After that, any vehicles that are part of the business's virtual lot would be assessed at public rates, or otherwise be dealt with as discussed herein.

The management of the parking facility where the business has its virtual lot can set up a user account for the business and the business provided with user access to add/subtract vehicle identifications/plates and/or maintain an appropriate balance in its account.

Users of the lot requiring per-transaction parking payment without an account can perform the transaction via the nearby kiosk 102. The kiosk 102 is in communication with the cloud server 108 as well, so the kiosk 102 has access to real time information about each vehicle entering and exiting the lot 112.

The cloud server 108 can be networked with and manage multiple different physical parking facilities, each of which can include a plurality of virtual lots.

Note that this application references certain trademarks and copyrights belonging to Municipal Parking Services, Inc., including the trademark SENTRY and the MPS logo. No rights to use any of these copyrights and trademarks are either express or implied by their mention in this patent application. The mention of these copyrights and trademarks is merely for illustrative purposes.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A parking facility management system, comprising:
   an entrance camera positioned to view a vehicle as the vehicle enters a parking facility;
   an exit camera positioned to view the vehicle as the vehicle exits the parking facility; and
   a central control computer networked with the entrance camera and the exit camera, wherein the central control computer includes a database of parking parameters for the parking facility, the parking parameters including parameters for a first class of vehicles and a second class of vehicles, wherein the parameters for each of the first and second classes of vehicles includes a total number of class spots, a number of used class spots and a number of remaining class spots, wherein the central control computer is configured to:
      determine the classification of the vehicle as the vehicle enters the parking facility and as the vehicle exits the parking facility;
      increase the number of used class spots for the first class of vehicles and decrease the number of remaining class spots for the first class of vehicles when the vehicle entering the facility is determined to belong to the first class of vehicles;
      increase the number of used class spots for the second class of vehicles and decrease the number of remaining class spots for the second class of vehicles when the vehicle entering the facility is determined to belong to the second class of vehicles;
      decrease the number of used class spots for the first class of vehicles and increase the number of remaining class spots for the first class of vehicles when the vehicle exiting the facility is determined to belong to the first class of vehicles; and
      decrease the number of used class spots for the second class of vehicles and increase the number of remaining class spots for the second class of vehicles when the vehicle exiting the facility is determined to belong to the second class of vehicles.

2. The system of claim 1, wherein the entrance camera and the exit camera are the same camera.

3. The system of claim 1, wherein the entrance camera and the exit camera are positioned to image a license plate of the vehicle.

4. The system of claim 1, further comprising a gate arm positioned adjacent to an entrance point to the parking facility and networked with the central control computer, wherein the central control computer is further configured to raise the gate arm only after making a determination that the vehicle belongs to one of the first or second classes of vehicles.

5. The system of claim 1, further comprising a kiosk provided to the parking facility and networked with the central control computer, the kiosk configured to accept a payment for parking in the parking facility for the vehicle and to report a payment status for the vehicle to the central control computer.

6. The system of claim 1, wherein the parking parameters further include parameters for an open class of vehicles, and wherein the central control computer is further configured to increase a parameter for a number of used open spots and decrease a parameter for a number of remaining open spots when the vehicle entering the facility is determined to belong to neither of the first or second classes of vehicles.

7. The system of claim 1, wherein the first class of vehicles is government employees.

8. The system of claim 1, wherein the second class of vehicles is an open class.

9. The system of claim 1, wherein the second class of vehicles is permit holders.

10. The system of claim 1, wherein upon the vehicle attempting to enter the parking facility, the central control computer is further configured to classify a vehicle determined to belong to the first class of vehicles as a vehicle belonging to the second class of vehicles for a given parking event when the number of remaining class spots for the first class of vehicles is zero.

11. The system of claim 1, wherein upon the vehicle attempting to enter the parking facility, the central control computer is further configured to classify a vehicle determined to belong to the first class of vehicles as a vehicle belonging to an open class of vehicles for a given parking event when the number of remaining class spots for the first class of vehicles is zero.

12. A method of managing a parking facility, the method comprising:
   obtaining an image of at least a portion of a vehicle entering the parking facility;
   relaying an image data for the portion of the vehicle entering the parking facility to a central control computer;
   obtaining an image of at least a portion of the vehicle exiting the parking facility;
   relaying an image data for the portion of the vehicle exiting the parking facility to a central control computer;
   determining by the central control computer the classification of the vehicle as the vehicle enters the parking facility;
   storing in memory of the central control computer parking parameters for at least a first and a second class of vehicle, the parking parameters including a total number of class spots, a number of used class spots and a number of remaining class spots;
   increasing the number of used class spots for the first class of vehicles and decreasing the number of remaining class spots for the first class of vehicles when the vehicle entering the facility is determined to belong to the first class of vehicles;
   increasing the number of used class spots for the second class of vehicles and decreasing the number of remaining class spots for the second class of vehicles when the vehicle entering the facility is determined to belong to the second class of vehicles;
   decreasing the number of used class spots for the first class of vehicles and increasing the number of remaining class spots for the first class of vehicles when the vehicle exiting the facility is determined to belong to the first class of vehicles; and
   decreasing the number of used class spots for the second class of vehicles and increasing the number of remaining class spots for the second class of vehicles when the vehicle exiting the facility is determined to belong to the second class of vehicles.

13. The method of claim 12, wherein the step of obtaining an image of at least a portion of a vehicle entering the parking facility includes using a camera to perform a license plate recognition of the vehicles license plate characters.

14. The system of claim 12, further comprising raising a gate arm at an entrance to the parking facility only after the central control computer performs the step of the classification of the vehicle.

15. The system of claim 12, further comprising accepting payment for a parking event for the vehicle via a kiosk networked with the central control computer and reporting a payment status for the vehicle to the central control computer.

16. The system of claim 12, further comprising increasing a parking parameter for a number of used open spots and decreasing a parking parameter for a number of remaining open spots when the vehicle entering the facility is determined to belong to neither of the first or second classes of vehicles.

17. The system of claim 12, further comprising classifying the vehicle determined to belong to the first class of vehicles as a vehicle belonging to the second class of vehicles for a given parking event when the number of remaining class spots for the first class of vehicles is zero.

18. The system of claim 12, further comprising classifying a vehicle determined to belong to the first class of vehicles as a vehicle belonging to an open class of vehicles for a given parking event when the number of remaining class spots for the first class of vehicles is zero.

19. A method of managing a parking facility, the method comprising:
   determining by a central control computer a classification of a vehicle as the vehicle enters the parking facility;
   storing in memory of the central control computer a plurality of parking parameters for at least a first and a second class of vehicle, the parking parameters including a total number of class spots, a number of used class spots and a number of remaining class spots;
   increasing the number of used class spots for the first class of vehicles and decreasing the number of remaining class spots for the first class of vehicles when the vehicle entering the facility is determined to belong to the first class of vehicles;
   increasing the number of used class spots for the second class of vehicles and decreasing the number of remaining class spots for the second class of vehicles when the vehicle entering the facility is determined to belong to the second class of vehicles;
   decreasing the number of used class spots for the first class of vehicles and increasing the number of remaining class spots for the first class of vehicles when the vehicle exiting the facility is determined to belong to the first class of vehicles; and
   decreasing the number of used class spots for the second class of vehicles and increasing the number of remaining class spots for the second class of vehicles when the vehicle exiting the facility is determined to belong to the second class of vehicles.

20. The method of claim 19, wherein the second class of vehicles is an open class.

* * * * *